US012782890B1

(12) United States Patent
Yoo et al.

(10) Patent No.: US 12,782,890 B1
(45) Date of Patent: Nov. 3, 2026

(54) AUTONOMOUS MANUFACTURING METHOD AND SYSTEM USING ASSET ADMINISTRATION SHELL (AAS) DATA

(71) Applicant: Industry-Academic Cooperation Foundation of Kyungnam University, Changwon-si (KR)

(72) Inventors: Nam Hyun Yoo, Changwon-si (KR); Hyo Jin Park, Changwon-si (KR); Minsu Jo, Changwon-si (KR)

(73) Assignee: Industry-Academic Cooperation Foundation of Kyungnam University, Changwon-si (KR)

( * ) Notice: Subject to any disclaimer, the term of this patent is extended or adjusted under 35 U.S.C. 154(b) by 0 days.

(21) Appl. No.: 19/437,647

(22) Filed: Dec. 31, 2025

(30) Foreign Application Priority Data

Dec. 26, 2025 (KR) ........................ 10-2025-0211368

(51) Int. Cl.
*G05B 13/02* (2006.01)
*G05B 19/05* (2006.01)

(52) U.S. Cl.
CPC ....... *G05B 13/0265* (2013.01); *G05B 19/058* (2013.01); *G05B 2219/14008* (2013.01)

(58) Field of Classification Search
CPC .............. G05B 13/0256; G05B 19/058; G05B 2219/14008
USPC ............................................................ 700/95
See application file for complete search history.

(56) References Cited

U.S. PATENT DOCUMENTS

| | | | | |
|---|---|---|---|---|
| 12,568,091 | B1 * | 3/2026 | Morgan | H04L 63/105 |
| 2012/0101638 | A1 * | 4/2012 | Lin | G05B 11/42 700/282 |
| 2021/0240166 | A1 * | 8/2021 | Georgiou | G05B 13/04 |
| 2025/0139088 | A1 * | 5/2025 | Weik | G06N 3/0455 |
| 2026/0024037 | A1 * | 1/2026 | Mystetskyi | G06Q 10/06316 |

OTHER PUBLICATIONS

Jinhong Yang et al., "Agent based Autonomous Manufacturing from Planning to Production: Experimental Study on Automatic Tool Generation and Control Using Large-Scale AAS Process Information", Berkeley RDI AgentX-LLM Agents MOOC Competition, https://youtu.be/alrfzhOwG-4?si=gHgGWHoB9E2bnISQ, Aug. 2, 2025.

* cited by examiner

*Primary Examiner* — Md Azad
(74) *Attorney, Agent, or Firm* — Bridgeway IP Law Group, PLLC; Jihun Kim

(57) ABSTRACT

Embodiments relate to an autonomous manufacturing method for executing processes through Model Context Protocol (MCP)-based control based on Asset Administration Shell (AAS) data. An autonomous manufacturing method performed by an artificial intelligence (AI) agent according to an embodiment includes: identifying at least one available process based on AAS data collected from an AAS server; identifying an available process facility corresponding to a target process selected from the at least one available process based on the AAS data; identifying target specifications of a product produced by the target process based on a prompt, and determining process conditions that satisfy the target specifications; and executing the available process facility according to the process conditions through an MCP server.

13 Claims, 8 Drawing Sheets

Table. AAS Process Groups Selected for MCP Tool Generation Experiments.

| Available Process | Operation ID(idShorts) Detail |
| --- | --- |
| Press/Press_Servo Type | AirPessure, AscendingSpeed, DescendingSpeed, DieCushion, Die-Height, LiftAbility, PressingSpeed, ReversingPower, StrokeLength, StrokesPerMinute, TransferPower |
| Heating/Heating_Quenching | CoolingPressure, CoolingTime, OperationVacuum, TemperatureIncreasePerHour, VacuumDegree, WorkingTemperature |
| Rolling/Rolling_hot | Production, RollHardness, RollerDiameter, RollerWidth, Rolling-Force, RollingLineSpeed |
| Heating/Heating_Aging | CoolingTime, OperationVacuum, TemperatureIncreasePerHour, VacuumDegree, WorkingTemperature |
| AFPM Motor Production | Coil_Insertion, Pressing, Cutting, Welding, Winding, Inspection_Result,Edit_CoilTurn |

FIG. 3

AUTONOMOUS MANUFACTURING METHOD AND SYSTEM USING ASSET ADMINISTRATION SHELL (AAS) DATA

CROSS-REFERENCE TO RELATED APPLICATION

This application is based on and claims priority under 35 U.S.C. § 119 to Korean Patent Application No. 10-2025-0211368, filed on Dec. 26, 2025, in the Korean Intellectual Property Office, the disclosure of which is incorporated by reference herein in its entirety.

BACKGROUND

Technical Field

The present invention relates to an autonomous manufacturing method and system. More particularly, the present invention relates to a method and system for executing manufacturing processes through Model Context Protocol (MCP)-based control based on Asset Administration Shell (AAS) data.

Description of the Related Art

Traditional manufacturing environments have relied heavily on production equipment controlled by Programmable Logic Controllers (PLCs) and similar technologies. While these systems offer advantages in terms of robustness and reliability, they reveal limitations in flexibly responding to the dynamic requirements of modern manufacturing paradigms.

Contemporary trends such as high-variety low-volume production and mass customization fundamentally require rapid reconfiguration of production lines and flexibility in work instructions. However, the inherent rigidity of existing systems impedes rapid responses to changing market demands, consequently creating bottlenecks in innovation and securing market competitiveness.

In response to these challenges, with the rapid advancement and domain expansion of Large Language Models (LLMs), attempts have been made to apply LLMs and AI agents to manufacturing environments. Methodologies are emerging to utilize these artificial intelligence technologies for the flexible and autonomous operation of manufacturing systems.

Existing automated manufacturing systems have attempted to utilize Multi-System Agents (MSA) to improve efficiency through distributed decision-making; however, these systems primarily rely on predefined rules and possess limited environmental perception capabilities, making it difficult to respond flexibly to unexpected situations. While recent Large Language Model (LLM) agents demonstrate superior reasoning and planning abilities compared to traditional systems, a significant technical gap remains in establishing a standardized methodology to connect these cognitive abilities with the physical control logic of actual industrial equipment.

Furthermore, in establishing an interface between digital twins, such as the Asset Administration Shell (AAS), and AI models, the manual generation of control tools serves as a critical bottleneck that severely impedes the scalability and adaptability of the system. To achieve truly autonomous manufacturing, it is essential to have a technical framework that can automatically transform standardized manufacturing process information (e.g., Operation Submodels) into executable tools based on a standardized interaction protocol like the Model Context Protocol (MCP), thereby enabling seamless natural language interaction between humans and cyber-physical systems.

This invention was supported by the Ministry of Science and ICT (MSIT) of the Republic of Korea under the following research and development programs: Innovative Human Resource Development for Local Intellectualization program, managed by the Institute of Information & Communications Technology Planning & Evaluation (IITP) (Grant No. IITP-2025-RS-2024-00436773), and Global Manufacturing Convergence S&W Development and Demonstration Support project, funded by the Korea government.

SUMMARY

The present invention aims to automatically control process equipment within a manufacturing site based on a Large Language Model (LLM). Specifically, the invention seeks to overcome the rigidity of traditional PLC-based systems by leveraging the reasoning and planning capabilities of AI agents. The objectives of the present invention are not limited to the aforementioned purposes; other objects and advantages not mentioned will be understood through the following description and more clearly understood by the embodiments of the present invention. Furthermore, it will be apparent that the objects and advantages of the present invention can be realized by the means and combinations thereof indicated in the claims.

To achieve the above objectives, an autonomous manufacturing method performed by an AI agent according to an embodiment of the present invention includes: identifying at least one available process based on Asset Administration Shell (AAS) data collected from an AAS server; identifying an available process facility corresponding to a target process selected from the at least one available process based on the AAS data; identifying target specifications of a product produced by the target process based on a prompt, and determining process conditions that satisfy the target specifications; and executing the available process facility according to the process conditions through a Model Context Protocol (MCP) server.

In one embodiment, identifying the available process includes identifying the available process based on process information defined in a submodel of the AAS data.

In one embodiment, identifying the available process facility includes determining the target process from the at least one available process based on the prompt.

In one embodiment, identifying the available process facility includes identifying at least one available process facility corresponding to a detailed process of the target process by referring to information defined in a submodel of the AAS data.

In one embodiment, identifying the available process facility includes transmitting a request to the AAS server or a Programmable Logic Controller (PLC) that controls the process facility through the MCP server to identify the available process facility.

In one embodiment, identifying the available process facility includes: transmitting a request converted into MCP format to the AAS server or the PLC through the MCP server; and receiving a response from the AAS server or the PLC through the MCP server to identify the available process facility.

In one embodiment, determining the process conditions includes inputting the target specifications into a Large Language Model (LLM) to identify the process conditions.

In one embodiment, the LLM generates the process conditions satisfying the target specifications as a response by referring to the AAS data of the available process facility.

In one embodiment, executing the available process facility includes: calling an API for executing the available process facility through the MCP server; and transmitting an execution command to a PLC corresponding to the available process facility through the called API.

In one embodiment, executing the available process facility includes accessing the AAS server through the MCP server to execute the available process facility.

In one embodiment, executing the available process facility includes transmitting an execution request converted into MCP format to the AAS server through the MCP server to execute the available process facility, wherein the AAS server transmits an execution command to a PLC corresponding to the available process facility based on protocol information defined in a submodel of the AAS data.

Furthermore, an autonomous manufacturing system according to an embodiment includes an AI agent, an AAS server, an MCP server, and a process facility. The AI agent identifies at least one available process and an available process facility based on AAS data, determines process conditions satisfying target specifications identified via a prompt, and executes the available process facility through the MCP server.

The present invention automatically controls process equipment within a manufacturing site through the interpretation of natural language commands and automatically generated MCP tools. This lowers the technical barrier for Human-Machine Interaction (HMI) in manufacturing environments. Consequently, the invention provides the advantage of flexibly responding to dynamic changes in modern manufacturing paradigms. Specific effects of the present invention, in addition to the above-described effects, will be described together while explaining specific details for carrying out the invention.

BRIEF DESCRIPTION OF THE DRAWINGS

FIG. 3 is a table showing examples of available processes identified through AAS (Asset Administration Shell) data.

DETAILED DESCRIPTION

Figure 1:
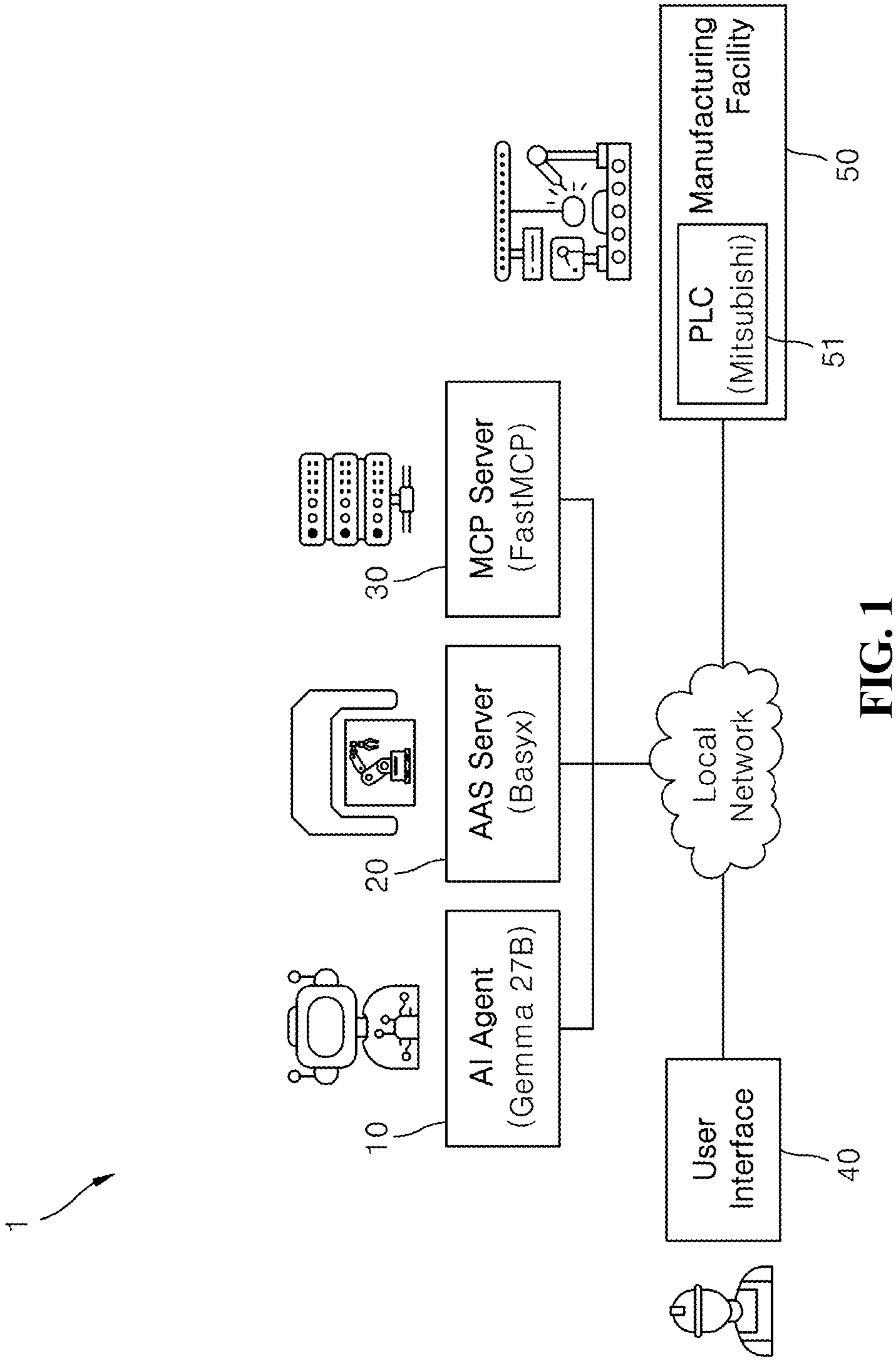
FIG. 1 is a diagram illustrating an autonomous manufacturing system according to an embodiment of the present invention.

Hereinafter, the advantages and features of the present invention, and the methods of achieving them, will become clear with reference to the embodiments described in detail below, along with the accompanying drawings. However, the present invention is not limited to the embodiments disclosed below but may be implemented in various different forms, and these embodiments are provided only to ensure that the disclosure of the present invention is complete and to fully convey the scope of the invention to those of ordinary skill in the art to which the invention pertains; the present invention is only defined by the scope of the claims. Throughout the specification, the same reference numerals refer to the same elements. "And/or" includes any and all combinations of one or more of the associated listed items.

Although the terms first, second, etc. may be used to describe various elements, components, and/or sections, these elements, components, and/or sections are not limited by these terms. These terms are only used to distinguish one element, component, or section from another element, component, or section. Thus, a first element, first component, or first section mentioned hereinafter could be a second element, second component, or second section, within the technical scope of the present invention.

Furthermore, the identifiers (e.g., a, b, c, etc.) used for each step are for convenience of explanation and do not describe the order of the respective steps; the steps may occur in a different order than the specified order unless the context clearly indicates a specific order. That is, the steps may occur in the same order as specified, may be performed substantially simultaneously, or may be performed in the reverse order.

In this specification, the phrase "any configuration is disposed on an upper portion (or a lower portion)" or "on (or under)" a component means not only that the configuration is disposed in contact with the upper surface (or lower surface) of the component, but also that another configuration may be interposed between the component and the arbitrary configuration disposed on (or under) the component.

Additionally, in this specification, when a component is described as being "connected," "coupled," or "joined" to another component, it should be understood that the components may be directly connected or joined to each other, but another component may be "interposed" between each component, or each component may be "connected," "coupled," or "joined" through another component.

The terminology used herein is for the purpose of describing particular embodiments only and is not intended to be limiting of the invention. As used herein, the singular forms are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention relates to an autonomous manufacturing method for executing processes through Model Context Protocol (MCP)-based control based on Asset Administration Shell (AAS) data. Hereinafter, the autonomous manufacturing method according to an embodiment of the present invention will be described in detail with reference to FIGS. 1 to 8.

Referring to FIG. 1, an autonomous manufacturing system 1 according to an embodiment of the present invention may include an artificial intelligence (AI) agent 10, an AAS server 20, an MCP server 30, a user interface 40, and a manufacturing facility 50. Each component may be connected through a Local Area Network (LAN) at a manufacturing site where the manufacturing facility 50 is established.

AAS is one of the core concepts of Industry 4.0, referring to a standardized digital representation (data) of physical assets such as the manufacturing facility 50. The AAS server 20 is a server that stores and manages such AAS data, enabling communication with other systems in a standardized manner through structured AAS data for each asset. In one example, the AAS server 20 of the present invention may be established based on Eclipse Basyx middleware.

Meanwhile, although the AAS server 20 and the manufacturing facility 50 are shown separately in FIG. 1, the AAS server 20 may be internalized within the manufacturing facility 50. In this case, the AAS server 20 can acquire information about the manufacturing facility 50 from a Programmable Logic Controller (PLC) 51 that controls each facility 50 and generate AAS data based thereon.

MCP refers to a standard interface protocol for communication between the AI agent 10 and other servers or systems. Accordingly, the AI agent 10 of the present invention may correspond to an MCP host. The MCP server 30 connects the AI agent 10—specifically, a Large Language Model (LLM) running on the agent 10—with external systems that the agent 10 can invoke and execute, such as the AAS server 20 and the manufacturing facility 50 (specifically, the PLC 51).

To this end, the MCP server 30 provides tools for the LLM to call external APIs, resources such as text, logs, and database schemas for the LLM to reference, and prompt templates for the LLM to follow. In one example, the MCP server 30 may be established using Python's FastMCP library.

The process of the AI agent 10 accessing the AAS server 20 through the MCP server 30 is as follows: When an operator inputs a prompt to the LLM through the user interface 40, the LLM may determine that an external system must be called to generate a response. At this time, the AI agent 10 converts the request for the external system call into a JSON-RPC format and provides it to the MCP server 30. The MCP server 30 delivers the request according to the API of the external system and receives a response. Subsequently, the MCP server 30 converts the received response back into the JSON-RPC format for the AI agent 10, and the LLM generates a natural language response based on that response.

A key technical feature of the present invention is the automated synthesis of MCP tools from standardized AAS Operation Submodels. Unlike conventional systems that require manual hard-coding of control logic for each piece of equipment, the present invention utilizes the structured granularity of AAS (e.g., idShorts, input/output parameters) to allow the LLM to dynamically generate executable Python-based FastMCP code. This overcomes the scalability bottleneck inherent in high-variety low-volume production environments by enabling the AI agent to "understand" and control new equipment without human reprogramming, provided the equipment is represented via a standardized AAS digital twin.

Furthermore, the present invention significantly improves the reliability of autonomous control by mapping the semantic richness of the AAS Operation Submodel to the MCP tool's description fields. By explicitly defining required inputs and generated outputs within the AAS Body, the AI agent can accurately extract necessary parameters from ambiguous natural language utterances, thereby reducing logical errors in industrial automation where high precision is required.

Figure 2:
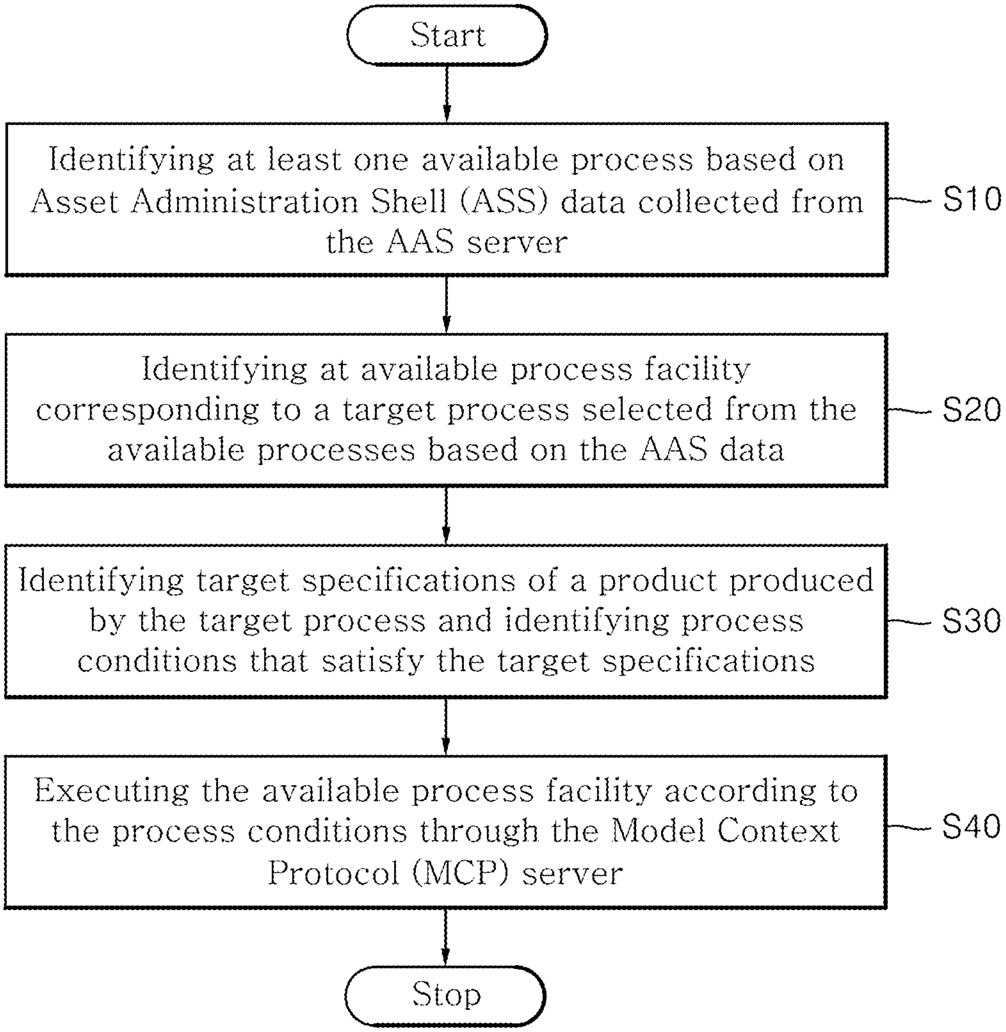
FIG. 2 is a flowchart illustrating an autonomous manufacturing method according to an embodiment of the present invention.

Referring to FIG. 2, an autonomous manufacturing method performed by the AI agent 10 according to an embodiment of the present invention may include:

S10: Identifying at least one available process based on Asset Administration Shell (AAS) data collected from the AAS server 20.

S20: Identifying an available process facility 50 corresponding to a target process selected from the available processes based on the AAS data.

S30: Identifying target specifications of a product produced by the target process and identifying process conditions that satisfy the target specifications.

S40: Executing the available process facility 50 according to the process conditions through the Model Context Protocol (MCP) server 30.

The autonomous manufacturing method shown in FIG. 2 is according to one embodiment, and each step is not limited to the embodiment shown in FIG. 2; some steps may be added, changed, or deleted as necessary.

To perform the operations described below, the AI agent 10 may include at least one physical element selected from a central processing unit (CPU), a graphic processing unit (GPU), application-specific integrated circuits (ASICs), digital signal processors (DSPs), digital signal processing devices (DSPDs), programmable logic devices (PLDs), field-programmable gate arrays (FPGAs), a controller, a micro-controller, a processor, and a microprocessor.

The AI agent 10 identifies at least one available process based on the AAS data collected from the AAS server 20 (S10). Information on available processes at the manufacturing site and the equipment required for those processes may be stored in the AAS server 20 in the form of AAS data. The AAS server 20 provides the AAS data to the AI agent 10 via the local network, and the AI agent 10 identifies the available processes using the AAS data.

In one embodiment, the AAS data consists of a header and a body. The header contains identification information for the AAS data itself, while the body includes a plurality of submodels describing various information about the asset (e.g., manufacturing facility 50). For example, each submodel may include technical specifications, certification information, process information for operation, drawings, manuals, and other documentation related to the manufacturing facility 50.

The AI agent 10 identifies available processes based on the process information defined in the submodels. Since executing a process requires the MCP server 30 to generate a tool for each process, and generating tools for all executable processes consumes excessive resources, the AI agent 10 may identify only representative processes with a high frequency of identification as available processes.

For example, referring to FIG. 3, the AI agent 10 groups AAS data into preset process groups and identifies representative processes (e.g., Press/Press_Servo Type, Heating/Heating_Quenching, Rolling/Rolling_hot, Heating/Heating_Aging, AFPM Motor Production) where the number of AAS data instances sharing a common operation ID (e.g., idShorts) exceeds a threshold or is ranked highly.

The method of identifying representative processes based on common idShorts (e.g., identifying that approximately 22% of total AAS files contain overlapping operation IDs) provides a significant technical advantage in resource management. By prioritizing these overlapping IDs, the AI agent 10 can reuse established MCP tool logic across similar manufacturing contexts, thereby reducing the search space and computational load for the LLM during dynamic tool generation. This enables the system to scale efficiently across large-scale repositories (e.g., over 4,500 AAS instances) without requiring unique tool synthesis for every individual asset.

Furthermore, the use of structured AAS submodels, such as SubmodelElementCollections and Properties, provides the semantic richness required for the LLM to perform high-fidelity reasoning. Unlike non-standardized representations, the granularity of AAS allows the AI agent 10 to extract precise execution parameters (e.g., AirPressure, StrokesPerMinute) required for industrial-grade control, which directly mitigates the risk of "hallucinations" or logical errors in the generated MCP control logic.

Figure 4:
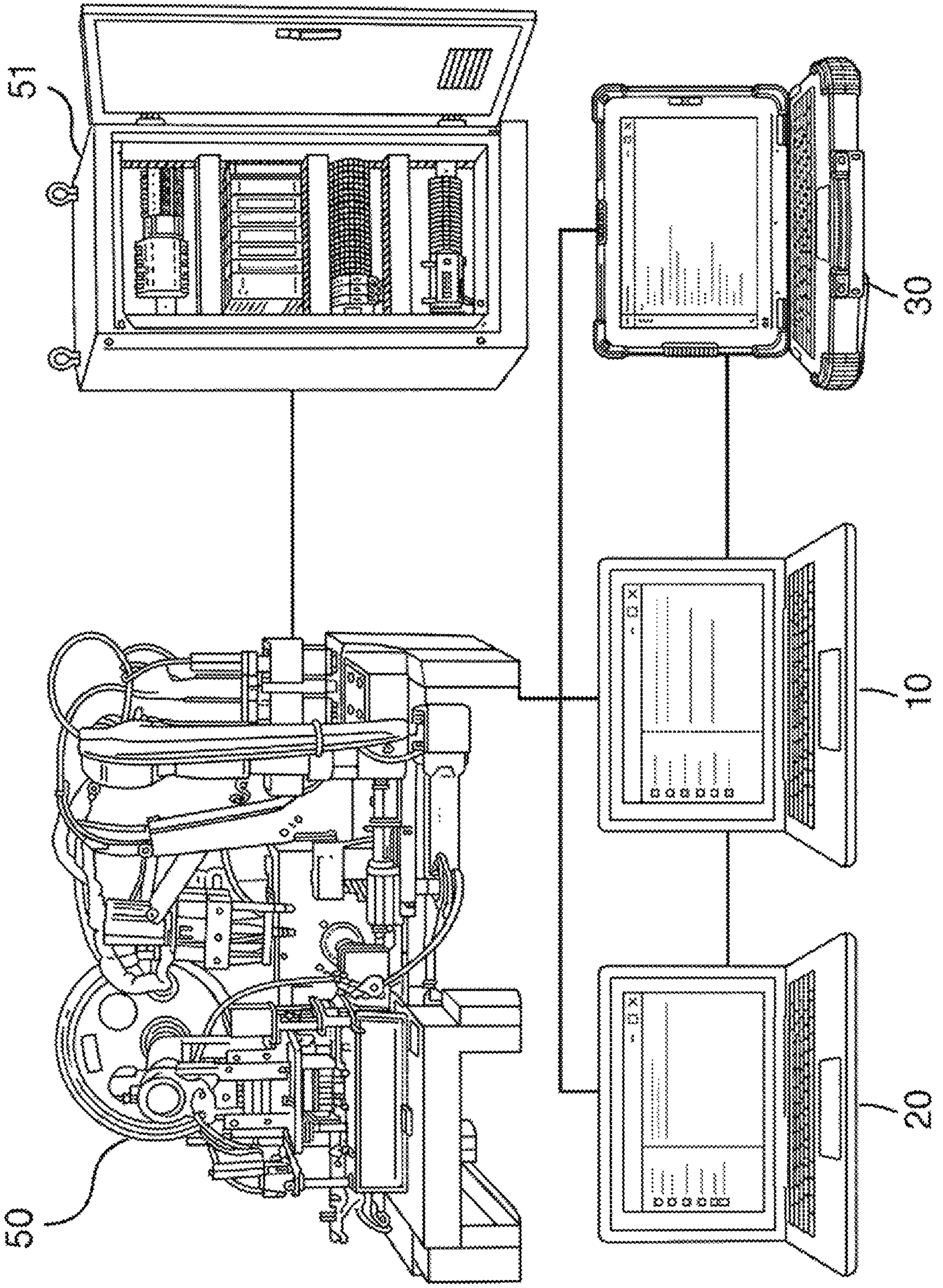
FIG. 4 is a diagram illustrating an example of an autonomous manufacturing system established in an actual manufacturing environment.
Figure 5:
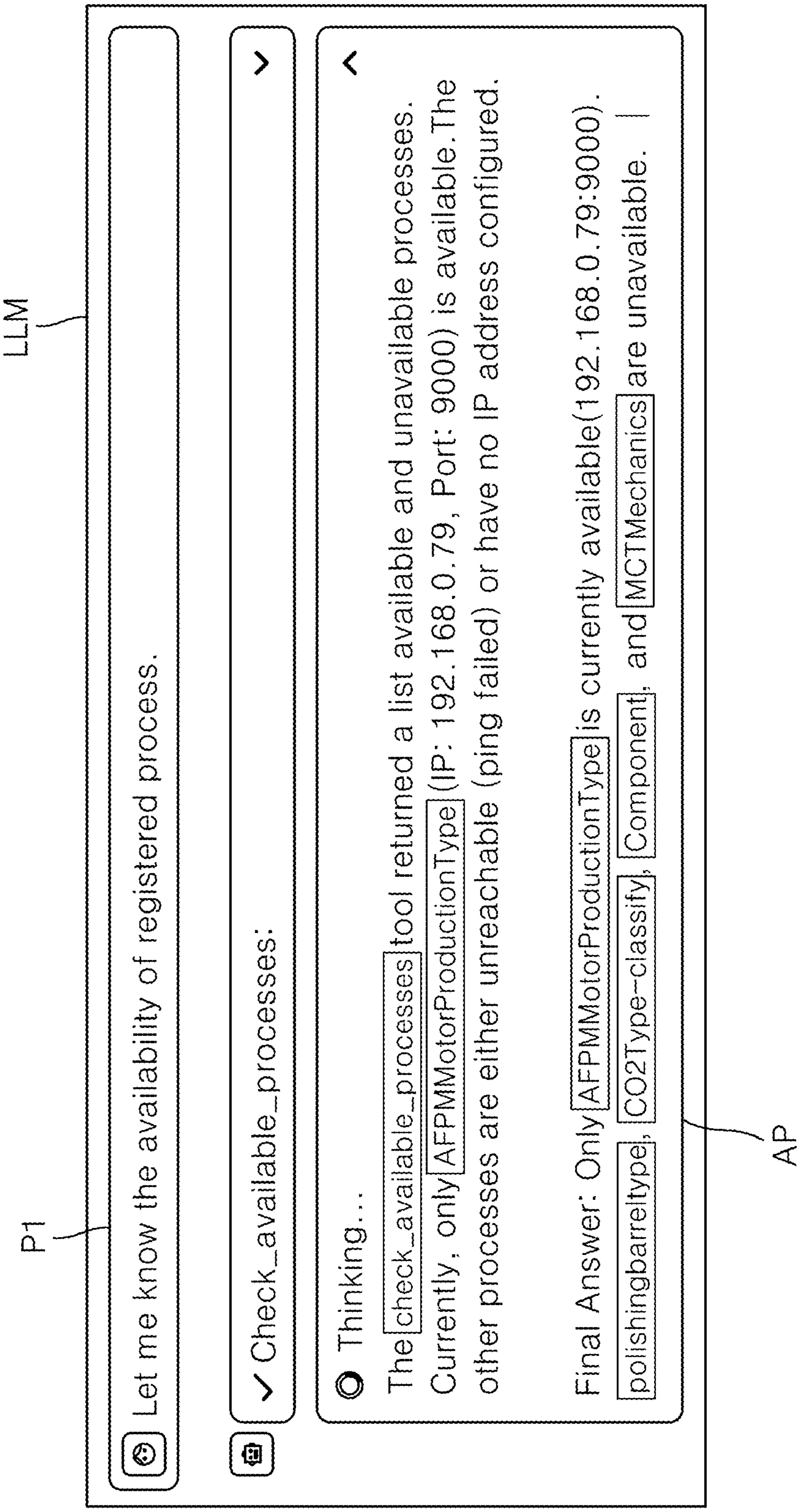
FIGS. 5 to 7 are diagrams for explaining operations of an AI agent using an LLM (Large Language Model).

A method of operating the AI agent 10 in the autonomous manufacturing system 1 illustrated in FIG. 4 will be described in detail. Referring to FIG. 5, an operator may request available processes by inputting a first prompt (P1) into the LLM. The AI agent 10 identifies at least one available process based on the AAS data collected from the AAS server 20, and the LLM may generate a response (AP) indicating what the available processes are as an answer to the first prompt (P1). For example, in the illustration of FIG. 5, "AFPM Motor Production" may appear as the only available process.

Subsequently, the AI agent 10 identifies an available process facility 50 corresponding to a target process selected from the available processes based on the AAS data (S20). To this end, the AI agent 10 first determines the target process from the at least one available process identified previously based on a prompt input through the LLM. This prompt may include a query corresponding to the target process the operator wishes to select. In one example, the LLM provides a list of previously identified available processes to the user interface 40, and the operator can input a query into the prompt to select one of the available processes as the target process.

Next, the AI agent 10 identifies the process facility 50 corresponding to the target process by referring to the AAS data. In an example where the AAS data includes the operational state of the manufacturing facility 50, the AI agent 10 determines whether the process facility 50 required for the target process is in an available state. Specifically, the AI agent 10 refers to the information defined in the submodel of the AAS data to identify at least one available process facility 50 corresponding to the detailed processes of the target process (e.g., if the target process is AFPM Motor Production, detailed processes such as coil insertion, pressing, cutting, welding, and winding).

In another example, if the AAS data does not include the operational state of the manufacturing facility 50, the AI agent 10 identifies the available process facility 50 by transmitting a request to the AAS server 20 or the PLC 51 controlling the manufacturing facility 50 through the MCP server 30. Specifically, the AI agent 10 transmits a request converted into the MCP format to the AAS server 20 or the PLC 51 via the MCP server 30. Here, converting the request into the MCP format means that the MCP server 30 converts the format of the request message according to the API of the external system (the AAS server 20 or the PLC 51).

The AAS server 20 or the PLC 51 verifies the operational state of the manufacturing facility 50 corresponding to the target process and generates a response. The AI agent 10 receives this response through the MCP server 30 to identify the available process facility 50. Specifically, the MCP server 30 converts the response from the AAS server 20 or the PLC 51 into an MCP format (e.g., JSON-RPC) and provides it to the AI agent 10, which then determines whether the manufacturing facility 50 required for the target process is available based on the converted response.

The identification process in step S20 in FIG. 2 is characterized by the AI agent's ability to map abstract natural language commands to specific industrial submodels. Conventional manufacturing systems require operators to have expert knowledge of equipment IDs and network addresses; however, the present invention utilizes the AI agent's intent recognition and parameter extraction capabilities to autonomously link a user's goal (e.g., "produce AFPM motor cores") with the relevant AAS-defined operational parameters. This significantly lowers the technical barrier for Human-Machine Interaction (HMI), allowing non-experts to effectively manage complex cyber-physical production lines.

Furthermore, the use of the MCP server 30 as a dynamic gateway between the reasoning model and the physical PLC 51 provides a mechanism for real-time validation of process executability. Unlike static production plans, the AI agent 10 of the present invention can verify the actual availability status of equipment through on-demand MCP tool calls (e.g., querying registers via pymodbus) before finalizing a plan. This dual-layer verification (AAS-based semantic check and MCP-based physical check) ensures high reliability in dynamic manufacturing environments where equipment states change frequently.

Figure 6:
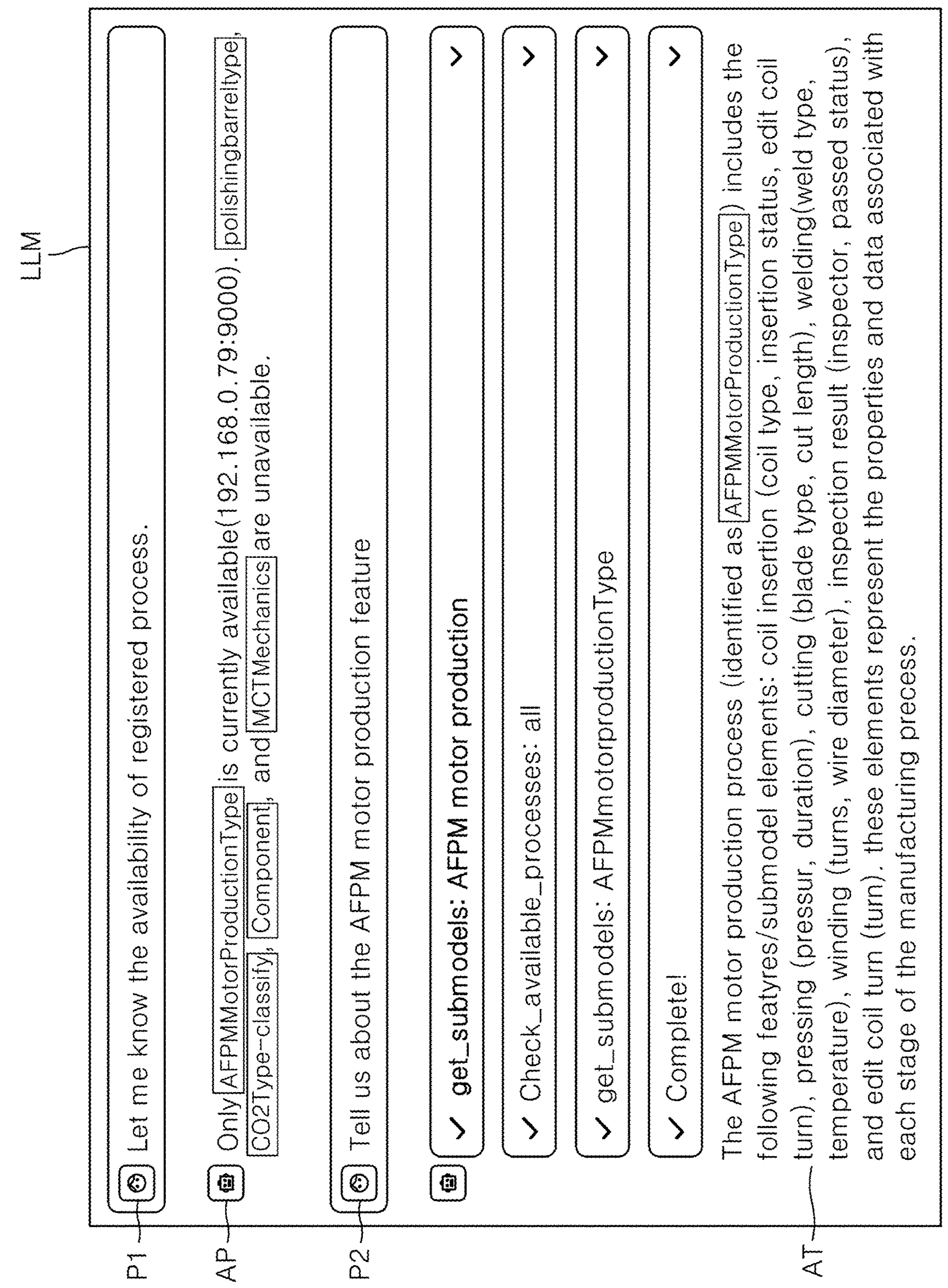

Referring to FIG. 6, an operator may select a target process (e.g., AFPM Motor Production) from the available processes by inputting a second prompt (P2) into the LLM. When the target process is selected, the AI agent 10 identifies detailed sub-processes (e.g., coil insertion, pressing, cutting, welding, winding, etc.) constituting the target process by referring to the AAS data, and the LLM may generate this as a response (AT). Furthermore, the AI agent 10 may verify whether the target process is executable by identifying the available process facility 50 according to the aforementioned method.

Subsequently, the AI agent 10 identifies the target specifications of a product to be produced by the target process based on a prompt and determines process conditions that satisfy the target specifications (S30). Specifically, the AI agent 10 may input the target specifications into the LLM, and the LLM may derive process conditions for achieving the target specifications through accessible external systems or its internal reasoning capabilities.

In an embodiment, to ensure that the derived process conditions are feasible at the manufacturing site, the AI agent 10 causes the LLM to refer to the AAS data of the available process facility 50. Accordingly, the LLM reflects the technical specifications and characteristics of the currently equipped available process facility 50 to derive and generate a response for the optimal process conditions.

Figure 7:
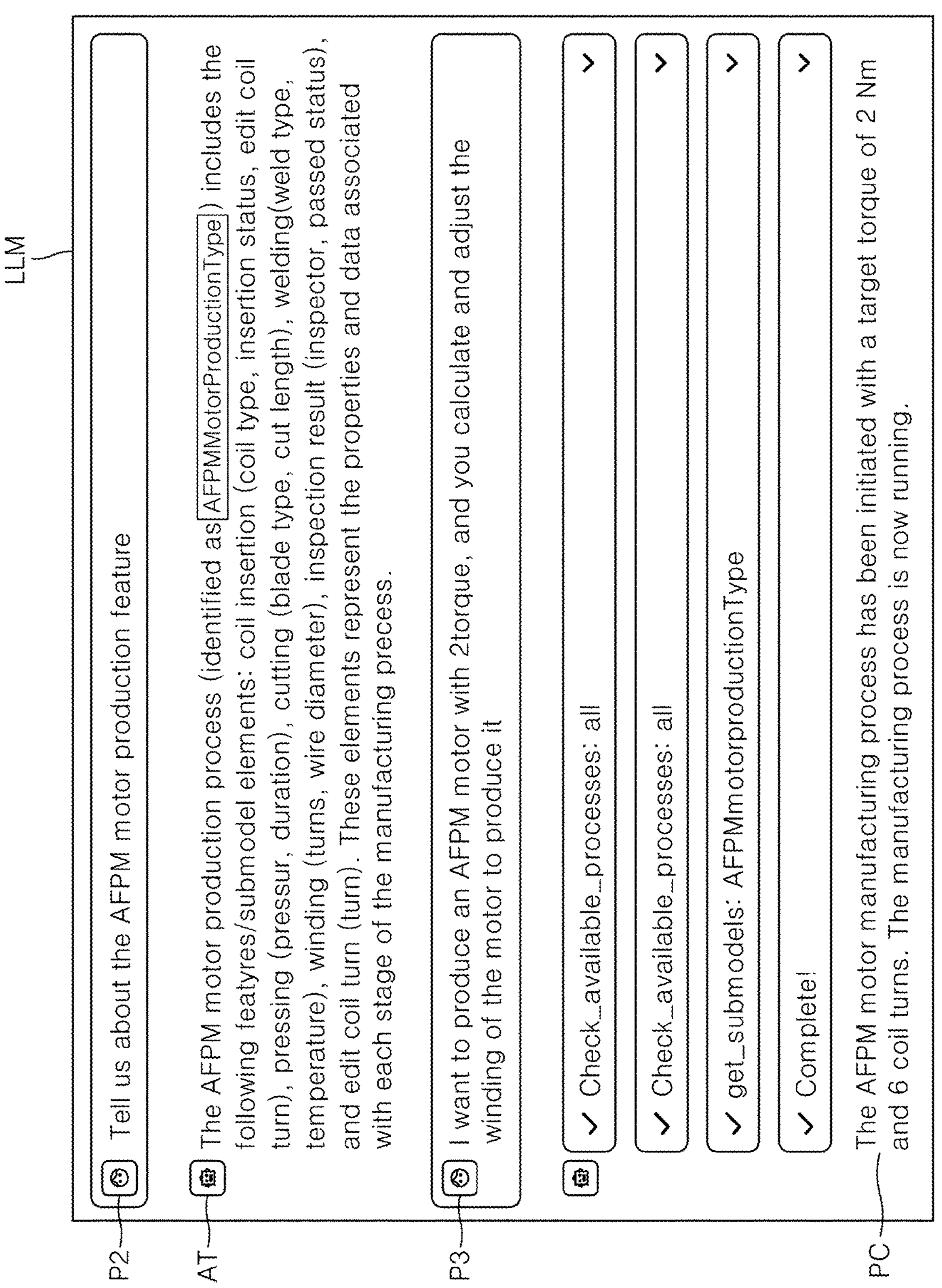

Referring to FIG. 7, an operator may input a third prompt (P3) including the target specifications (e.g., "2 torque"). The LLM refers to the AAS data provided by the AI agent 10 to derive the process conditions (e.g., "set_coil_turn: 6") for the available process facility 50 and generates this as a response (PC).

Next, the AI agent 10 executes the available process facility 50 through the MCP server 30 according to the determined process conditions (S40). In one example, the AI agent 10 directly controls the PLC 51 through the MCP server 30. To achieve this, the AI agent 10 calls an API for executing the available process facility 50 through the MCP server 30 and transmits an execution command to the PLC 51 corresponding to the facility. Information regarding the API may be identified through the Operation Submodel of the AAS data.

For example, the AI agent 10 converts the execution command for the available process facility 50 into a JSON-RPC format and provides it to the MCP server 30. The MCP server 30 then calls the API according to the protocol used by the PLC 51 (e.g., pymodbus for Modbus TCP) and transmits the execution command. The PLC 51 executes the available process facility 50 according to the received execution command.

A significant technical advantage of step S30 is the prevention of "LLM hallucinations" in industrial control through grounded reasoning based on AAS data. While generic LLMs might suggest theoretically possible but practically unachievable process conditions, the present invention constrains the LLM's reasoning space using the technical capabilities (e.g., maximum speed, pressure, or torque limits) defined in the AAS submodels of the actual equipment on the floor. This ensures that the generated process conditions (e.g., the relationship between torque and coil turns) are both physically accurate and operationally viable within the specific constraints of the target facility 50.

Furthermore, step S40 provides a novel layer of protocol abstraction by utilizing the MCP server 30 as a standard gateway. By decoupling the AI agent's natural language logic from the specific communication protocols (e.g., Modbus, OPC UA) of various PLCs, the system allows for the integration of heterogeneous equipment without requiring the agent to be hard-coded for each specific hardware interface. The ability of the MCP server to dynamically recognize and map idShorts from AAS to executable MCP tools represents a substantial improvement over existing fixed-automation systems, enabling rapid reconfiguration in high-variety manufacturing environments.

In another embodiment, the AI agent 10 may execute the available process facility 50 by accessing the AAS server 20 through the MCP server 30. To achieve this, the AI agent 10 transmits an execution request converted into the Model Context Protocol (MCP) format to the AAS server 20 via the MCP server 30. Specifically, the AI agent 10 converts a message requesting execution for the available process facility 50 into a JSON-RPC format and provides it to the MCP server 30. The MCP server 30 then converts the format of the request message according to the API of the AAS server 20 and transmits the message to the AAS server 20.

Figure 8:
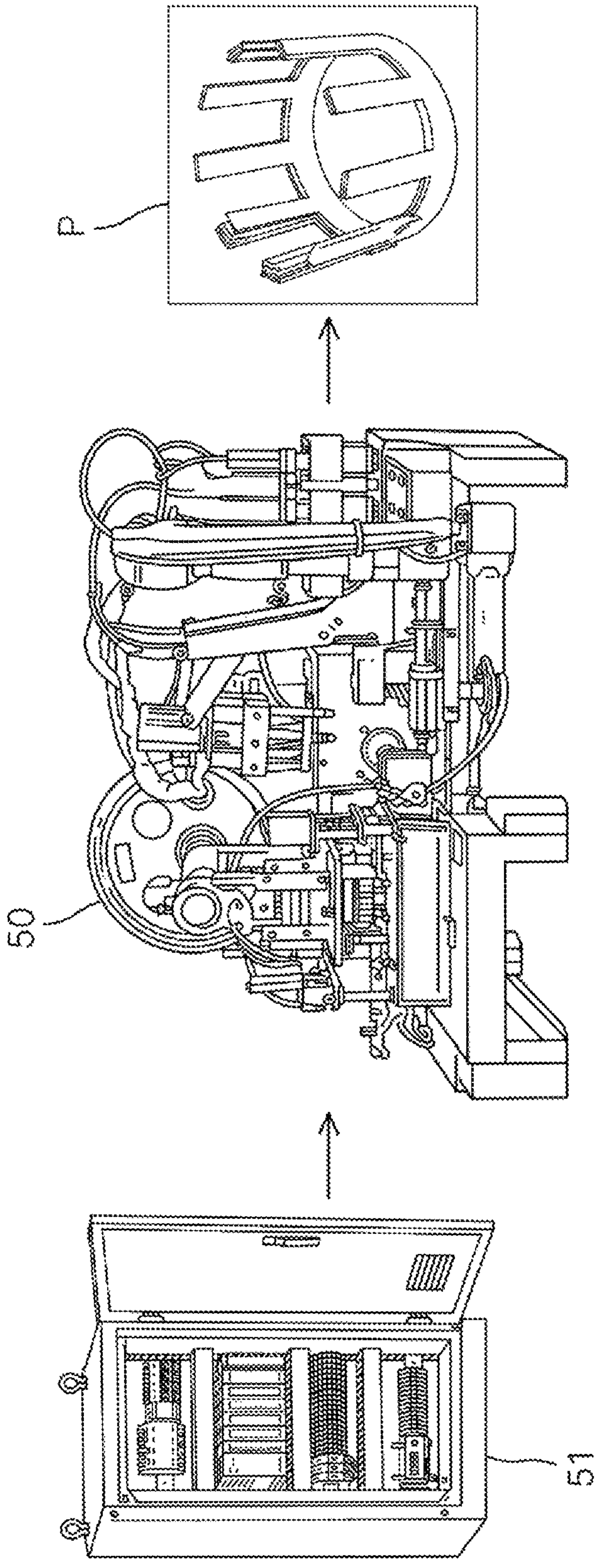
FIG. 8 is a diagram illustrating a process in which a product is produced through autonomous execution of a facility.

The AAS server 20 identifies the PLC 51 corresponding to the available process facility 50 based on the request message and transmits an execution command to the PLC 51 based on protocol information defined in a submodel of the AAS data. The PLC 51 then executes the available process facility 50 according to the received execution command. Referring to FIG. 8, the PLC 51 executes the facility 50 according to the command, and a product (P) is produced as the manufacturing facility 50 operates.

For the aforementioned operations, the MCP server 30 may automatically generate tools for calling external systems, such as the PLC 51 and the AAS server 20. Specifically, the MCP server 30 automatically synthesizes tools that the LLM can use by parsing API endpoints, parameters, and response structures defined in the external system's schema or API documentation. Additionally, the MCP server 30 may dynamically scan the endpoints of external systems and automatically generate tools based on the scanned functionalities.

This tool generation operation by the MCP server 30 is performed for each representative process group described with reference to FIG. 3. In this case, once the LLM understands a specific process through a particular tool, it can easily understand other processes accessible through the same tool due to the standardized nature of the AAS representations.

As described above, the present invention automatically controls manufacturing facilities 50 through natural language command interpretation and automatically generated MCP tools. This effectively lowers the technical barriers to Human-Machine Interaction (HMI) on the factory floor. Consequently, manufacturing systems can respond flexibly to the dynamic shifts in modern manufacturing paradigms, such as mass customization and high-variety low-volume production.

A primary distinction of the present invention over prior art is the automated transformation of standardized AAS "Operation" data into executable MCP tools. Conventional methods rely on manual mapping of each industrial function, which is unsustainable in large-scale environments (e.g., repositories with >4,500 instances). By implementing a structured 5-step prompt strategy (Instruction, Syntax Overview, Task Specification, Process Information, Output Format), the system achieves a success rate of up to 96% in generating syntactically and functionally correct control code. This automation ensures that the system can adapt to new machinery in real-time without the "bottleneck" of manual software development.

Furthermore, the present invention provides a unified control plane for heterogeneous manufacturing environments. By utilizing the MCP server 30 as an abstraction layer, the AI agent 10 can interact with equipment from various vendors (e.g., Mitsubishi, Siemens, etc.) using a consistent natural language interface, provided the assets are mapped to the AAS standard. This solves the "information silo" problem prevalent in traditional factories and enables end-to-end orchestration from planning to production without vendor-specific logic hard-coded into the AI's reasoning framework.

While the present invention has been described with reference to the illustrated embodiments, it is not limited thereto. It is apparent that various modifications can be made by those skilled in the art within the scope of the technical spirit of the invention. Even if certain operational effects of the configuration were not explicitly described, any effects predictable by such configuration should be recognized.

What is claimed is:

1. An autonomous manufacturing method using Asset Administration Shell (AAS) data, the method performed by an artificial intelligence (AI) agent comprising a processor, an AAS server, a Model Context Protocol (MCP) server, and a process facility controlled by a Programmable Logic Controller (PLC), and the method comprising:

automatically generating an MCP tool by parsing an API endpoint and a parameter structure defined in an AAS Operation Submodel of the AAS data;

identifying at least one available process and an available process facility corresponding to a target process selected from the at least one available process based on AAS data collected from the AAS server;

identifying target specifications of a product produced by the target process based on a prompt;

determining process conditions satisfying the target specifications by constraining a reasoning space of a Large Language Model (LLM) using technical limits defined in the AAS data of the available process facility; and executing the available process facility according to the process conditions by converting an execution command into a JASON-RPC format and transmitting the converted command through the MCP server to the PLC.

2. The method of claim 1, wherein the identifying the at least one available process comprises identifying the at least one available process based on process information defined in a submodel of the AAS data.

3. The method of claim 1, wherein the identifying the available process facility comprises determining the target process from the at least one available process based on the prompt.

4. The method of claim 1, wherein the identifying the available process facility comprises identifying at least one available process facility corresponding to a detailed process of the target process by referring to information defined in a submodel of the AAS data.

5. The method of claim 1, wherein the identifying the available process facility comprises transmitting a request to the AAS server or the PLC that controls a process facility through the MCP server to identify the available process facility.

6. The method of claim 5, wherein the identifying the available process facility comprises:

transmitting a request converted into an MCP format to the AAS server or the PLC through the MCP server; and receiving a response from the AAS server or the PLC through the MCP server to identify the available process facility.

7. The method of claim 1, wherein the determining the process conditions comprises inputting the target specifications into the LLM to identify the process conditions.

8. The method of claim 7, wherein the LLM generates the process conditions satisfying the target specifications as a response by referring to the AAS data of the available process facility.

9. The method of claim 1, wherein the executing the available process facility comprises:

calling an API for executing the available process facility through the MCP server; and transmitting the execution command to the PLC corresponding to the available process facility through the called API.

10. The method of claim 1, wherein the executing the available process facility comprises accessing the AAS server through the MCP server to execute the available process facility.

11. The method of claim 10, wherein the executing the available process facility comprises transmitting an execution request converted into an MCP format to the AAS server through the MCP server to execute the available process facility, and wherein the AAS server transmits the execution command to the PLC corresponding to the available process facility based on protocol information defined in a submodel of the AAS data.

12. A non-transitory computer-readable recording medium storing a program comprising instructions which, when executed by a computer, cause the computer to perform the autonomous manufacturing method according to claim 1.

13. An autonomous manufacturing system using AAS data, comprising an AI agent comprising a processor, an AAS server, an MCP server, and a process facility controlled by a PLC, wherein the AI agent is configured to:

identify at least one available process and an available process facility corresponding to a target process selected from the at least one available process based on AAS data collected from the AAS server;

identify target specifications of a product produced by the target process based on a prompt;

determine process conditions satisfying the target specifications by constraining a reasoning space of an LLM using technical limits defined in the AAS data of the available process facility; and execute the available process facility according to the process conditions by converting an execution command into a JASON-RPC format and transmitting the converted command through the MCP server to the PLC.

* * * * *